J. C. ELZY & F. MESSENGER.
JACK.
APPLICATION FILED DEC. 28, 1916.

1,221,712. Patented Apr. 3, 1917.

UNITED STATES PATENT OFFICE.

JOHN C. ELZY AND FREDERICK MESSENGER, OF ST. PAUL, MINNESOTA.

JACK.

1,221,712.     Specification of Letters Patent.      Patented Apr. 3, 1917.

Application filed December 28, 1916. Serial No. 139,259.

*To all whom it may concern:*

Be it known that we, JOHN C. ELZY and FREDERICK MESSENGER, citizens of the United States, residing at St. Paul, in county of Ramsey and State of Minnesota, have invented certain new and useful Improvements in Jacks, of which the following is a specification.

Our invention relates to an improvement in jacks for lifting vehicle-wheels from the ground, and admitting of their being turned freely by hand, while holding the wheel in the position placed, while work is being done on it, without the necessity of crawling under the vehicle, or the usual inconvenience attendant upon repair of a tire or wheel.

Our invention consists in a U-shaped frame having a roller permanently journaled at one end, and having notches at the other end, in connection with a U-shaped lever which is mounted in these notches and carries a roller which is adapted to be forced beneath the wheel to be raised to lift the latter upon the two rollers, whereupon it is locked in place by being thrown over the dead-center. The wheel is capable of being turned anti-frictionally upon the two roller supports for the purposes of repair and the like.

In the accompanying drawings:—

Figure 1:
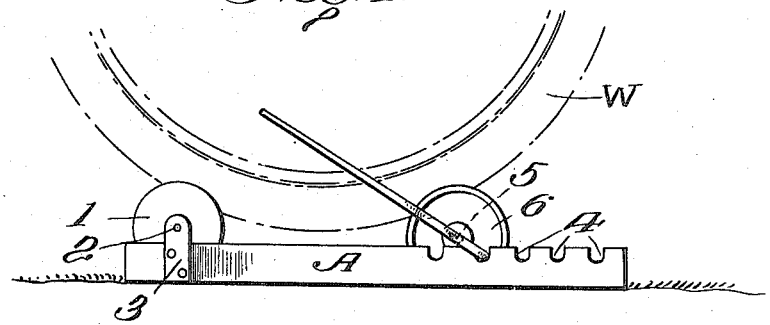
Figure 1 is a view in side elevation.
Figure 2:
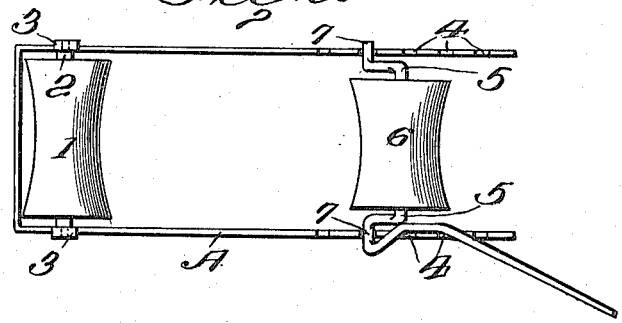
Fig. 2 is a plan view of the same.
Figure 3:
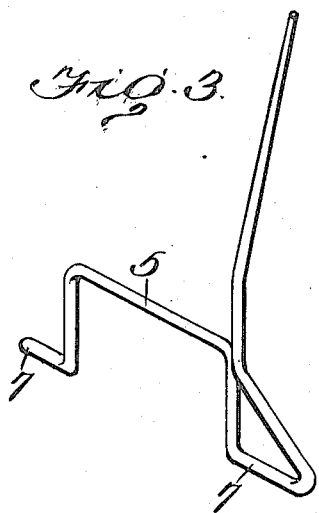
Figs. 3 and 4 are details.
Figure 4:
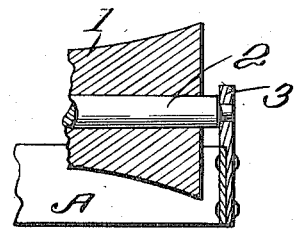

A, is the U-shaped frame, preferably cast or made of sheet-metal, and having a roller 1 journaled at one end upon an axle 2, the ends of which are secured in the brackets 3, 3, secured in the frame A. The roller might be mounted in any other approved manner, as for instance in an open notch, or in various other ways.

At the opposite or open end of the U-shaped frame A, a plurality of notches, 4, 4, are provided.

A U-shaped lever 5 carries a roller 6, similar to roller 1, and the bearings 7, 7, of this U-shaped lever are adapted to be removably mounted and turned in any two of the oppositely-located notches 4, 4, selected for the purpose.

To apply and use the jack, the U-shaped frame is slipped beneath the wheel (as shown in Fig. 1) until the roller 1 is against the rim or tire, or in proximity thereto. Then the U-shaped lever 5 is placed in position with bearings 7, 7, in oppositely-located notches 4, 4, in position with respect to the size of the wheel, and as close to the wheel as judgment dictates, with the handle of the lever extending outward (as shown in Fig. 1), after which the lever is swung toward the other roller until the dead center is passed, thus lifting the wheel W from the ground or floor where it normally rests, and making it possible to turn the wheel by hand on the anti-friction rollers 1 and 2 supporting it, so that access may be had to any part thereof with the utmost convenience.

Thus we have provided a simple device, effective for the purpose, which consists of few parts, easily assembled or taken apart, and packed away in a tool-case, and which, when in operation, can be operated with the application of very little strength or power on the part of the operator.

We claim:

1. A jack comprising a frame having one unobstructed end, wherein and through which to receive a wheel to be lifted, said frame provided with an anti-friction roller at the other end, and a roller detachably connected with the unobstructed end, whereby said detachable roller may be inserted beneath the wheel, and means for raising and lowering one at least of said rollers beneath the wheel to be lifted, whereby to throw the weight of the latter upon both rollers to raise the wheel from the ground or floor.

2. A jack comprising a frame having two rollers, one detachable, the detachable roller carried upon a U-shaped lever, the ends of which are in the form of bearings, and the handle serving to swing the roller in the arc of a circle against the wheel to be lifted, whereby the wheel is raised and supported upon the two rollers and capable of being turned thereon.

3. A jack comprising a U-shaped frame having a roller journaled at one end, and open notches at the other, in combination with a U-shaped lever, the ends of which form bearings, and upon the center of which a roller is mounted, said lever adapted to be detachably mounted in oppositely located notches and swung so that the axis of the roller moves in the arc of a circle, and to be locked by the lever passing its dead-center.

In testimony whereof we affix our signatures.

JOHN C. ELZY.
FREDERICK MESSENGER.

Copies of this patent may be obtained for five cents each, by addressing the "Commissioner of Patents, Washington, D. C."